United States Patent
Yuuki et al.

[11] Patent Number: 6,108,063
[45] Date of Patent: Aug. 22, 2000

[54] METHOD OF MANUFACTURING LIQUID CRYSTAL PANEL USING ETCHING TO FORM MICROLENSES, A HEAT RESISTING POROUS SUBSTRATE, OR A BARRIER FILM PREVENTING SODIUM DIFFUSION

[75] Inventors: Akimasa Yuuki; Masami Hayashi, both of Tokyo, Japan

[73] Assignee: Mitsushita Denki Kabushiki Kaisha, Tokyo, Japan

[21] Appl. No.: 09/038,915

[22] Filed: Mar. 12, 1998

[30] Foreign Application Priority Data

Mar. 28, 1997 [JP] Japan ..................................... 9-078647

[51] Int. Cl.[7] ....................... G02F 1/1335; G02F 1/1333; G02F 1/13; C30B 33/00
[52] U.S. Cl. ............................ 349/95; 349/122; 349/187; 216/23
[58] Field of Search ..................................... 349/187, 158, 349/160, 95, 122; 216/23, 31

[56] References Cited

U.S. PATENT DOCUMENTS 5,764,323  6/1998  Shin ............................................ 216/23
5,766,493  6/1998  Fukuda ........................................ 349/95

FOREIGN PATENT DOCUMENTS 4116619  4/1992  Japan .
8262419  10/1996  Japan .
9138392  5/1997  Japan .

*Primary Examiner*—Walter Malinowski
*Attorney, Agent, or Firm*—Leydig, Voit & Mayer

[57] ABSTRACT

A first glass substrate which is in contact with a liquid crystal layer is etched from its outer face. In this case, a panel to be etched is disposed on a susceptor with the first glass substrate being directed toward a shower head. The etching is carried out by uniformly spraying etchant from the shower head onto a face of the glass substrate.

10 Claims, 6 Drawing Sheets

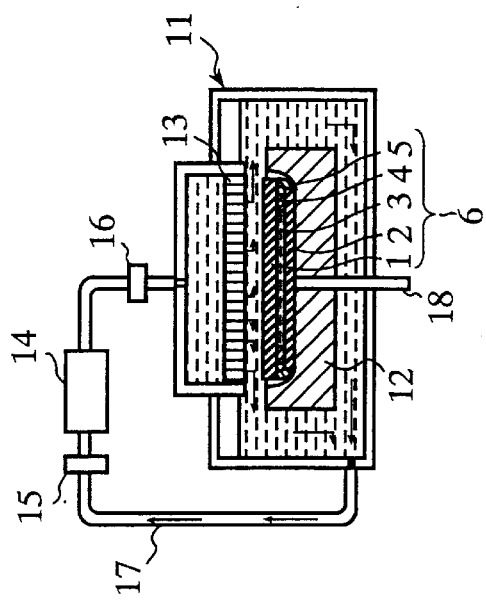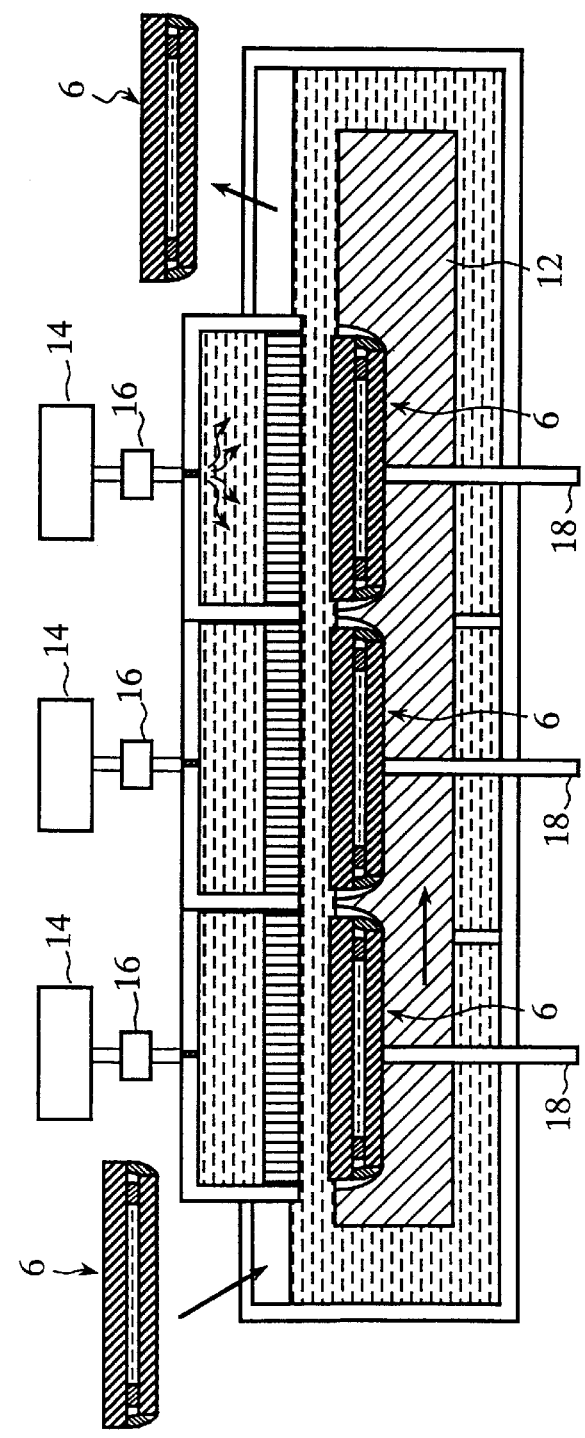
FIG.1A
FIG.1B

METHOD OF MANUFACTURING LIQUID CRYSTAL PANEL USING ETCHING TO FORM MICROLENSES, A HEAT RESISTING POROUS SUBSTRATE, OR A BARRIER FILM PREVENTING SODIUM DIFFUSION

BACKGROUND OF THE INVENTION

1. Field of the Invention

The present invention relates to a method of manufacturing a liquid crystal panel.

2. Description of the Prior Art

At the present time, a liquid crystal panel is used as a display of portable note type personal computers. The liquid crystal panel has a structure in which a liquid crystal layer fills the space between two glass substrates. One substrate is composed of a glass substrate on which a (thin film transistor) array is formed, and the other substrate is composed of a glass substrate on which a color filter is formed.

Such a liquid crystal panel is manufactured by laminating a glass substrate formed with a TFT array onto a glass substrate formed with a color filter, and injecting liquid crystal between the glass substrates.

In manufacture of a liquid crystal panel, a glass substrate is required to be carried to a specific position, and accordingly, the glass substrate must have a certain degree of rigidity. In a carrying method used for a conventional manufacturing line for a liquid crystal panel, an approximately 1 mm thick glass substrate is used because a glass substrate having a thickness of 0.5 mm or less is deflected by the weight thereof. Because a specific gravity of glass is about 2.8, in the case of a 12.1 inch type panel used for a portable note type personal computer, the weight of one glass substrate is about 160 g.

Since the conventional liquid crystal panel is manufactured as described above, the total weight of two glass substrates is about 320 g. As a result, there arises a problem that these glass substrates are too heavy to realize a portable notebook type personal computer having an ideal weight of 1 kg or less.

In the case of changing the carrying method so as not to cause deflection of a glass substrate even if the glass substrate is thinned, the existing manufacturing line must be changed. This presents a problem that an enormous sum of equipment investment is required to change the manufacturing line.

SUMMARY OF THE INVENTION

The present invention has been accomplished for solving the above-mentioned problems and an object of the present invention is to provide a method of manufacturing a liquid crystal panel intended to reduce a total weight of glass substrates without the need of changing the existing manufacturing line.

According to a first aspect of the present invention, either or each of a first glass substrate formed with TFTs and a second glass substrate formed with a color filter is etched from its outer face reversed to its inner face opposed to an inner face of the other glass substrate.

With this configuration, there can be obtained an effect of capable of reducing a total weight of the glass substrates.

According to a second aspect of the present invention, either or each of the first and second glass substrates is etched by spouting etchant onto a glass substrate face from a large number of spout holes provided in a shower head disposed opposite to the glass substrate face.

With this configuration, there can be obtained an effect of capable of uniformly etching the glass substrate.

According to a third aspect of the present invention, a glass substrate not containing barium is used as a glass substrate to be etched, of the first and second glass substrates.

With this configuration, there can be obtained an effect of capable of ensuring a smooth surface of the glass substrate having been etched.

According to a fourth aspect of the present invention, in the case of using a glass substrate containing sodium as the first glass substrate, a barrier film for preventing diffusion of sodium is formed on a face of the first glass substrate.

With this configuration, there can be obtained an effect of capable of suppressing diffusion of sodium at a step of heat-treatment of the first glass substrate.

According to a fifth aspect of the present invention, an outer face of the first glass substrate, reversed to an inner face thereof opposed to an inner surface of the second glass substrate, is bonded on a flat plate integrated with a housing in such a manner that the first and second glass substrates are covered with the housing.

With this configuration, there can be obtained an effect of capable of improving an impact resistance of the panel, thereby eliminating a fear of fracture of the panel when it is dropped down.

According to a sixth aspect of the present invention, the second glass substrate is etched from its outer face reversed to its inner face opposed to an inner face of the first glass substrate in such a manner that the above outer face of the second glass substrate is formed in a corrugated face in which boundaries between adjacent rows of display dots are recessed.

With this configuration, there can be obtained an effect of capable of improving a light transmittance.

According to a seventh aspect of the present invention, an outer face of the second glass substrate reversed to its inner face opposed to an inner face of the first glass substrate is etched by forming a resist pattern having opening portions at boundaries between the adjacent rows of the above display dots on the above outer face of the second glass substrate, etching the outer face of the second glass substrate using the resist pattern as an etching mask and removing the resist pattern, and etching the outer face of the second glass substrate again.

With this configuration, there can be obtained an effect of capable of easily forming micro-lenses for collecting transmission light.

According to an eighth aspect of the present invention, a glass substrate bonded on a porous substrate having a surface covered with a silicon film is used as either or each of the first and second glass substrates, and a portion of the silicon film positioned at a bonding surface of the porous substrate bonded to the glass substrate is dissolved by a peeling solution permeating in the porous substrate, to thereby peel the glass substrate from the porous substrate.

With this configuration, there can be obtained an effect of capable of reducing a total weight of the glass substrates.

According to a ninth aspect of the present invention, a $SiO_2$ film formed by CVD on a heat-resisting porous substrate having a surface covered with a silicon film is used as either or each of the first and second glass substrates, and a portion of the silicon film positioned at a bonding surface of the porous substrate bonded to the glass substrate is dissolved by a peeling solution permeating in the porous substrate, to thereby peel the glass substrate from the porous substrate.

With this configuration, there can be obtained an effect of capable of further reducing a total weight of the glass substrates.

BRIEF DESCRIPTION OF THE DRAWINGS

FIGS. 1A and 1B are schematic sectional views for description of Embodiment 1 of the present invention, showing a state in which a glass substrate is etched by a liquid-phase etching system;

DETAILED DESCRIPTION OF THE PREFERRED EMBODIMENTS

Figure 2A:
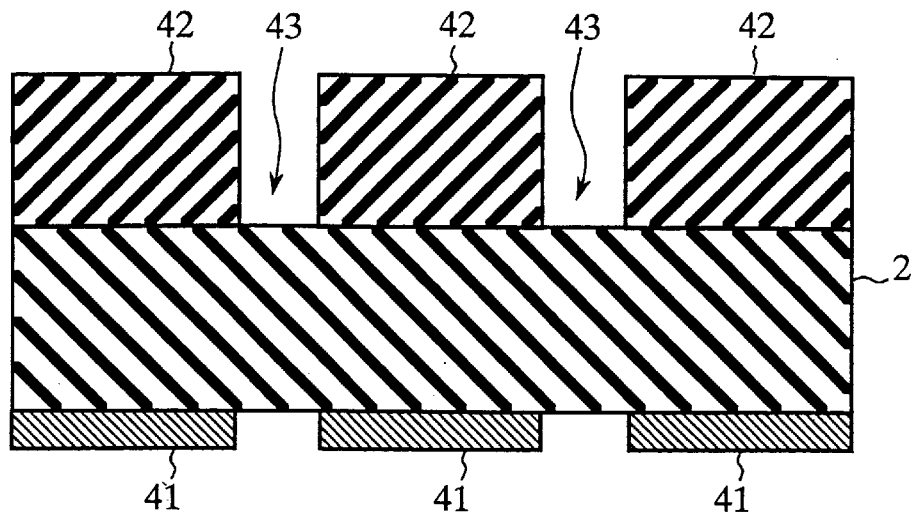
FIGS. 2A to 2C are schematic sectional views for description of Embodiment 4 of the present invention, showing steps of forming micro-lenses for collecting transmission light in a second glass substrate.

Embodiments of the present invention will be described below.

Embodiment 1

FIGS. 1A and 1B are schematic sectional views for description of Embodiment 1, showing a state in which a glass substrate is etched by a liquid-phase etching system, wherein FIG. 1A is a transverse sectional view and FIG. 1B is a vertical sectional view. In these figures, reference numeral 1 indicates an approximately 0.7–2.0 mm thick first glass substrate on which a TFT array is formed; 2 is an approximately 0.7–2.0 mm thick second glass substrate on which a color filter is formed; 3 is a liquid crystal layer filled between the first and second glass substrates 1 and 2; 4 is a liquid crystal sealing material for preventing leakage of liquid crystal; 5 is a sealing material for protecting the liquid crystal sealing material 4 and pixel electrodes (not shown) disposed at a peripheral portion of the first glass substrate 1 from etchant; and 6 is a panel to be etched, which includes the first and second glass substrates 1 and 2, liquid crystal layer 3, liquid crystal sealing material 4, and sealing material 5. As the etchant, there is used hydrofluoric acid (HF) or the like. In the case of using hydrofluoric acid (HF) as the etchant, teflon based putty such as teflon rubber, a resin such as rosin, or copper is used as the sealing material 5.

Reference numeral 11 indicates a liquid-phase etching system for etching a glass substrate; 12 is a susceptor containing a heater (not shown); 13 is a shower head for spouting etchant; 14 is a circulating pump for circulating etchant; 15 is a filter for removing dust (particles produced by etching) contained in the spent etchant; 16 is a cooler for cooling etchant; 17 is piping through which etchant is circulated; and 18 is piping for feeding pure water over the susceptor 12. In FIG. 1A, the directions along which etchant and pure water flow are indicated by arrows. The shower head 13 is disposed opposite to a face of a glass substrate when the panel 6 to be etched is disposed on the susceptor 12. The shower head 13 has a large number of spout holes for spouting etchant. The spout holes are provided in such a manner as to be directed in the direction perpendicular to a face of a glass substrate when the panel 6 to be etched is disposed on the susceptor 12.

The liquid-phase etching system 11 is allowed to etch a plurality of the panels 6 to be etched by moving the panels 6. In FIG. 1B, the direction along which the panels 6 to be etched are moved using a moving mechanism (not shown) is indicated by an arrow.

Next, a method of manufacturing a liquid crystal panel will be described.

First, a TFT array is formed on the first glass substrate 1 and a color filter is formed on the second glass substrate 2. At both the step of forming the TFT array and the step of forming the color filter, in addition to the TFT array and the color filter, simultaneously formed are other elements required to be provided on the first and second glass substrates 1 and 2.

The first glass substrate 1 formed with the TFT array is laminated on the second glass substrate 2 formed with the color filter. Then, liquid crystal is injected between the first and second glass substrates 1 and 2 thus laminated. The above-described steps are carried out in accordance with a conventional process.

Subsequently, the liquid crystal sealing material 4 and pixel electrodes disposed at a peripheral portion of the first glass substrate 1 are covered with the sealing material 5 composed of teflon based putty such as teflon rubber, a resin such as rosin, or copper. In this way, a panel 6 to be etched is accomplished.

The first glass substrate 1 is etched from its outer face reversed to its inner face which is opposed to an inner face of the second glass substrate 2 and which is in contact with the liquid crystal layer 3. The etching is performed by the etching system 11 shown in FIGS. 1A and 1B using hydrofluoric acid (HF) as etchant.

In this case, the panel 6 to be etched is disposed on the susceptor 12 with the first glass substrate 1 being directed on the shower head 13 side. In the case where the panel 6 to be etched is disposed as described above, the shower head 13 faces to a glass substrate face of the first glass substrate 1. Then, etchant is uniformly spouted from the plurality of the spout holes provided in the shower head 13 onto the glass substrate face of the first glass substrate 1. At this time, the panel 6 to be etched is heated at a temperature slightly lower than 100° C. by the heater contained in the susceptor 12, and the etchant is cooled at about 5° C. by the cooler 16. Further, pure water is supplied on a back surface side of the panel 6 disposed on the susceptor 12, that is, on the second glass substrate 2 side through the piping 18 for preventing running of the etchant on the back surface side of the panel 6. In addition, to prevent the second glass substrate 2 from the etchant running on the back surface side of the panel 6 to be etched, a resist film may be provided on the second glass substrate 2.

The second glass substrate 2 is then etched in the same manner as that used for the first glass substrate 1.

Then, a polarizing sheet is stuck on each of the first and second glass substrates 1 and 2, to thus accomplish a liquid crystal panel.

As described above, according to Embodiment 1, since the first and second glass substrates 1 and 2 are etched, there can be obtained an effect capable of reducing a total weight of the glass substrates.

Since the etchant is uniformly spouted from the plurality of the spout holes provided in the shower head 13 onto the glass substrate face of each of the first and second glass substrates 1 and 2, there can be obtained an effect of capable of uniformly etching the first and second glass substrates 1 and 2.

Since the panel 6 to be etched is heated at a temperature slightly lower than 100° C. and each of the first and second glass substrates 1 and 2 is etched using the etchant cooled at about 5° C., there can be obtained an effect capable of effectively separating particles produced by etching from the glass substrate face of each of the first and second glass substrates 1 and 2 through thermal migration due to temperature gradient. In addition, by continuously or periodically applying vibration to the panel 6 to be etched during etching using an oscillator (not shown), there can be obtained an effect of capable of more effectively separating particles produced by etching from the glass substrate face of each of the first and second substrates 1 and 2.

Since running of the etchant on the back surface side of the panel 6 to be etched is prevented by supplying pure water on the back surface side of the panel 6 disposed on the susceptor 12 through the piping 18, there can be obtained an effect of capable of preventing etching of an unnecessary portion.

Since the etchant is circulated using the circulating pipe 14, followed by removal of particles produced by etching through the filter 15 to re-use the etchant, there can be obtained an effect of capable of making effective use of the etchant.

Further, since a plurality of the panels 6 to be etched are simultaneously etched while the panels 6 are moved, there can be obtained an effect of capable of realizing a high throughput.

In addition, even in the case where one of the first and second glass substrates 1 and 2 is etched, there can be obtained an effect of capable of reducing a total weight of the glass substrates.

Embodiment 2

When a glass substrate containing barium (Ba) is etched using hydrofluoric acid (HF) as etchant, particles of BaF2 are precipitated and remain on a glass substrate surface. The particles of BaF2 thus remaining on the glass substrate surface possibly coarsens the glass substrate surface. From this viewpoint, in this embodiment, a glass substrate not containing barium (Ba) is used as a glass substrate to be etched.

As described above, according to this embodiment, since a glass substrate not containing barium (Ba) is used as a glass substrate to be etched, there can be obtained an effect of capable of ensuring a smooth surface of the glass substrate having been etched.

Embodiment 3

In this embodiment, a glass substrate not containing barium (Ba) but containing sodium (Na) is used as a first glass substrate. And, before a heat-treatment step for formation of a TFT array, a barrier film made from $SiO_2$ or $Si_3N_4$ is formed by CVD or sputtering on a face of the first glass substrate 1 on the side where the TFT is to be formed.

As described above, according to this embodiment, a glass substrate not containing barium (Ba) but containing sodium (Na) is used as the first glass substrate, and before a heat-treatment step for formation of a TFT array, a barrier film made from $SiO_2$ or $Si_3N_4$ is formed on a face of the first glass substrate on the side where the TFT is to be formed. As a result, there can be obtained an effect of capable of suppressing diffusion of sodium (Na) at the heat-treatment step for formation of the TFT array on the first glass substrate.

Embodiment 4

In this embodiment, micro-lenses for collecting transmission light are formed in a second glass substrate in such a manner as to avoid wirings provided in a liquid crystal panel.

FIGS. 2A to 2C and FIGS. 3A and 3B are schematic sectional views for description of Embodiment 4, showing steps of forming micro-lenses for collecting transmission light in a second glass substrate. In these figures, reference numeral 41 indicates a color filter; 42 is a resist pattern; 43 is an opening portion provided in the resist pattern 42; 44 is etchant for etching a second glass substrate 2; 45 is a semi-cylindrical groove formed in the second glass substrate 2; and 46 is a micro-lens for collecting transmission light formed in the second glass substrate 2. Other reference numerals are the same as those show in FIGS. 1A and 1B.

Next, a method of manufacturing a liquid crystal panel will be described.

The same procedure as that in Embodiment 1 is repeated until a panel 6 to be etched is formed.

The resist pattern 42 is then formed on an outer face of the second glass substrate 2 reversed to its inner surface which is opposed to an inner surface of the first glass substrate 1 and which is in contact with the liquid crystal layer 3 (FIG. 2A). The resist pattern 42 is a line-and-space pattern having the opening portions 43, which are positioned, assuming that display dots specified for each TFT are composed of a plurality of rows, at boundaries between the adjacent rows of the display dots. In other words, since the color filters 41 are provided for each display dot, the resist pattern 42 is the line-and-space pattern having the opening portions 43 at the boundaries between the adjacent rows of the color filters 41.

Figure 2B:
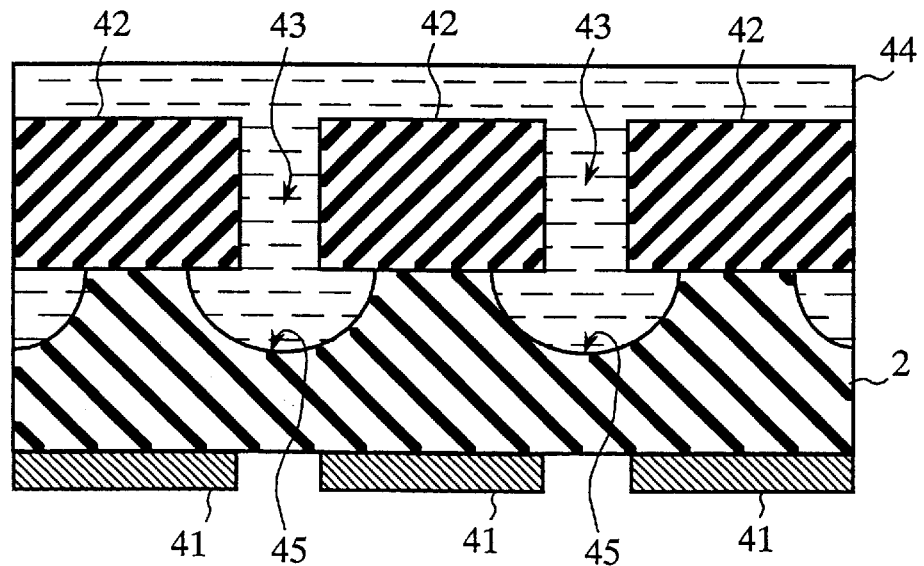

The second glass substrate 2 is etched from the outer face reversed to the inner face which is opposed to the inner face of the first substrate 1 and which is in contact with the liquid crystal layer 3, using the resist pattern 42 as an etching mask (FIG. 2B). The etching is carried out by the etching system shown in FIGS. 1A and 1B using hydrofluoric acid (HF) as the etchant 44. For example, the second glass substrate 2 having a thickness of approximately 0.7 to 1.0 mm is etched for 30 min using hydrofluoric acid (HF) of about 40 wt %. At this etching step, the semi-cylindrical grooves 45 are formed in the second glass substrate 2.

Figure 2C:
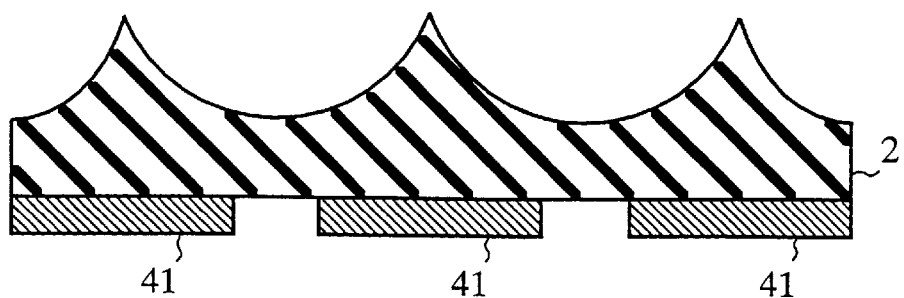

The resist pattern 42 is then removed (FIG. 2C).

Figure 3A:
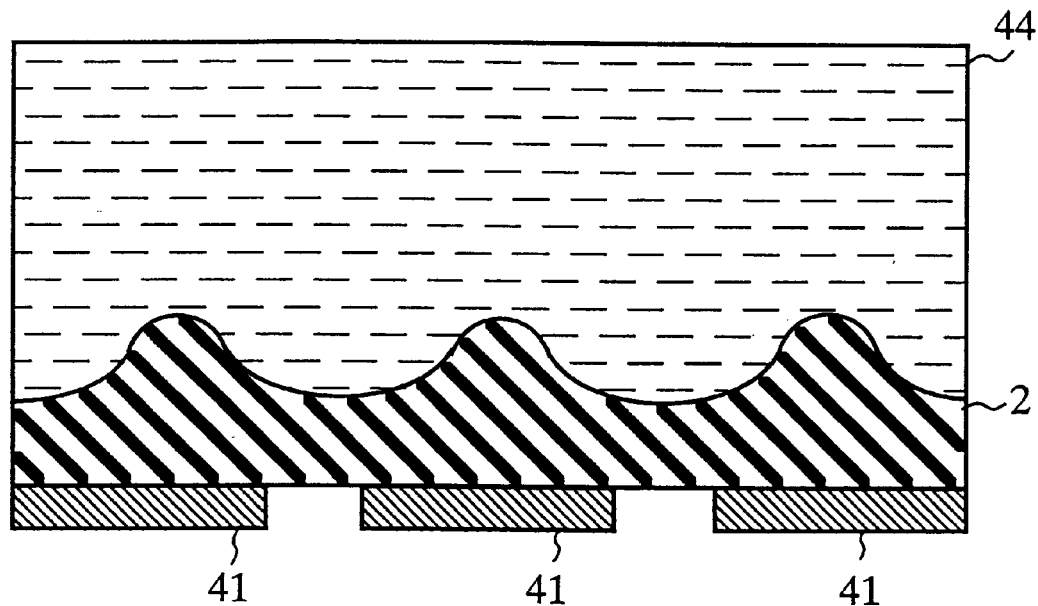
FIGS. 3A and 3B are schematic sectional views for description of Embodiment 4, continuous to FIGS. 2A to 2C, showing the steps of forming the micro-lenses for transmission light in the second glass substrate.
Figure 3B:
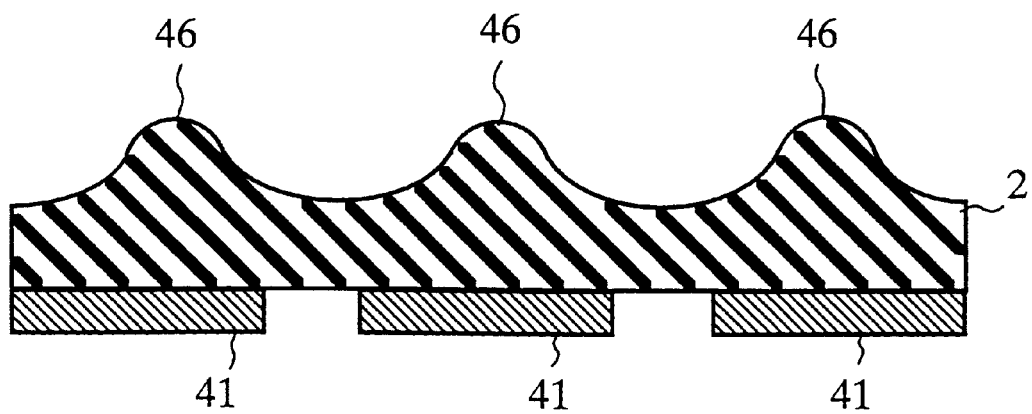

Subsequently, the second glass substrate 2 is etched again from the outer face reversed to the inner face which is opposed to the inner face of the first glass substrate 1 and which is in contact with the liquid crystal layer 3 (FIG. 3A). This etching step is carried out using hydrofluoric acid (HF) as the etchant 44, for example, for about 1 min. At this etching step, the outer face of the second glass substrate 2 reversed to its inner face which is opposed to the inner face of the first glass substrate 1, is formed into a corrugated face in which the boundaries between the adjacent rows of the display dots are recessed. Thus, the micro-lenses 46 for collecting transmission light are formed in the second glass substrate 2 in such a manner as to avoid wirings provided in the liquid crystal panel (FIG. 3B).

As described above, according to this embodiment, since the micro-lenses 46 for collecting transmission light are formed in the second glass substrate 2 in such a manner as to avoid wirings provided in the liquid crystal panel when the second glass substrate 2 is etched, there can be obtained an effect capable of improving a light transmittance while reducing a total weight of the glass substrates. Further, since the light transmittance is improved, there can be obtained an effect of capable of eliminating, in a liquid crystal panel of a backlight type, the need of provision of a prism sheet which is one factor for increasing the cost.

Embodiment 5

In this embodiment, an approximately 0.1–0.4 mm thick glass substrate, which is bonded on a porous substrate having a surface covered with a silicon film, is used as each of first and second glass substrates; and the glass substrate is peeled from the porous substrate after a step of injecting liquid crystal.

FIGS. 4A to 4C and FIGS. 5A and 5B are schematic sectional views for description of Embodiment 5, showing steps of manufacturing a liquid crystal panel. In these figures, reference numeral 51 indicates an approximately 0.5–1.0 mm thick first porous substrate to which the first glass substrate 1 is bonded; 52 is an approximately 0.5–1.0 mm thick second porous substrate to which the second glass substrate 2 is bonded; 53 is a silicon film for covering each of the first and second porous substrates 51 and 52; 54 is an adhesive layer for bonding each of the first and second glass substrates 1 and 2 to each of the first and second porous substrates 51 and 52; and 55 is a sealing material for protecting, a liquid crystal sealing material 4 and pixel electrodes (not shown) disposed at a peripheral portion of the first glass substrate 1, from a solution used for peeling the glass substrates from the porous substrates. Other reference numerals are the same as those in FIGS. 1A and 1B. As each of the first and second porous substrate 51 and 52, there is used a porous glass substrate having pores of several $\mu$m in diameter (for example, MICRO POROIS GLASS MPG-AM, produced by Asahi Glass Co., Ltd.), or a porous quartz glass substrate having pores of several $\mu$m in diameter (for example, MICRO POROIS GLASS MPG-AS, produced by Asahi Glass Co., Ltd.). Alternatively, there is used a heat-resisting material 61 such as SiC, Mo or Invar, shown in FIGS. 6A and 6B. In the heat-resisting material 61, pores 62 each having a diameter of approximately 0.1–1.0 $\mu$m are formed in such a manner as to pass through the heat-resisting material 61 and to be regularly arranged with a pitch of approximately 1–10 mm. FIGS. 6A and 6B show a state in which the heat-resisting material 61 is covered with a silicon film 63, wherein FIG. 6A is a plan view and FIG. 6B is a sectional view. As the peeling solution, there is used an APW solution (mixture of ethylenediamine, pyrogallol, and water at a mixing ratio (in volume) of 1:2:2) or the like. In the case of using the APW solution as the peeling solution, teflon based putty such as teflon rubber, a resin such as rosin, or copper may be used as the sealing material 55.

Next, a method of manufacturing a liquid crystal panel will be described.

Figure 4A:
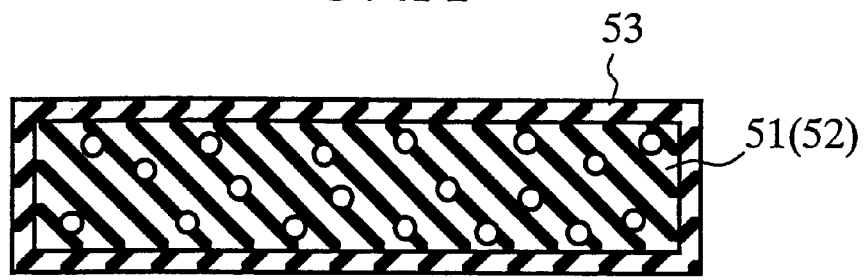
FIGS. 4A to 4C are schematic sectional views for description of Embodiment 5 of the present invention, showing steps of manufacturing a liquid crystal panel.

First, the silicon film 53 having a thickness of several $\mu$m is formed on a surface of each of the first and second porous substrates 51 and 52 by CVD (FIG. 4A). The pores in the surface of each of the first and second porous substrates 51 and 52 are blocked by the silicon film 53.

Figure 4B:
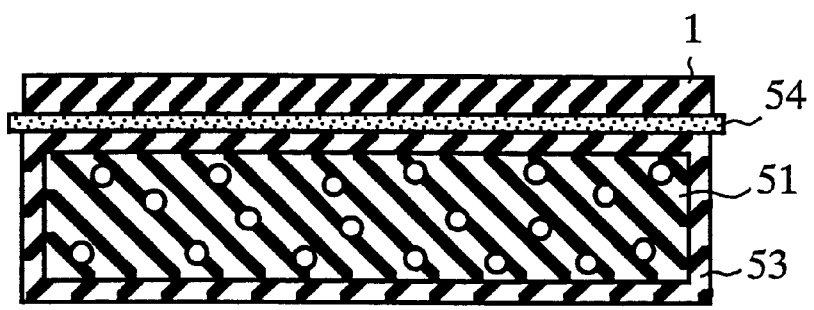

The first glass substrate 1 is bonded on the first porous substrate 51 and the second glass substrate 2 is bonded on the second porous substrate 52 (FIG. 4B). FIG. 4B shows a state in which the first glass substrate 1 is bonded on the first porous substrate 51 through the adhesive layer 54.

Figure 4C:
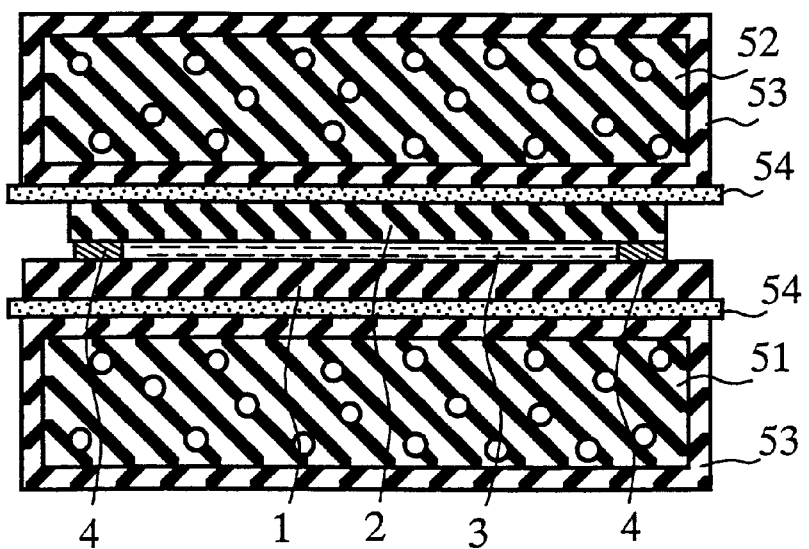

After the above step, the same procedure as that in Embodiment 1 is repeated until the step of injecting liquid crystal (FIG. 4C).

Figure 5A:
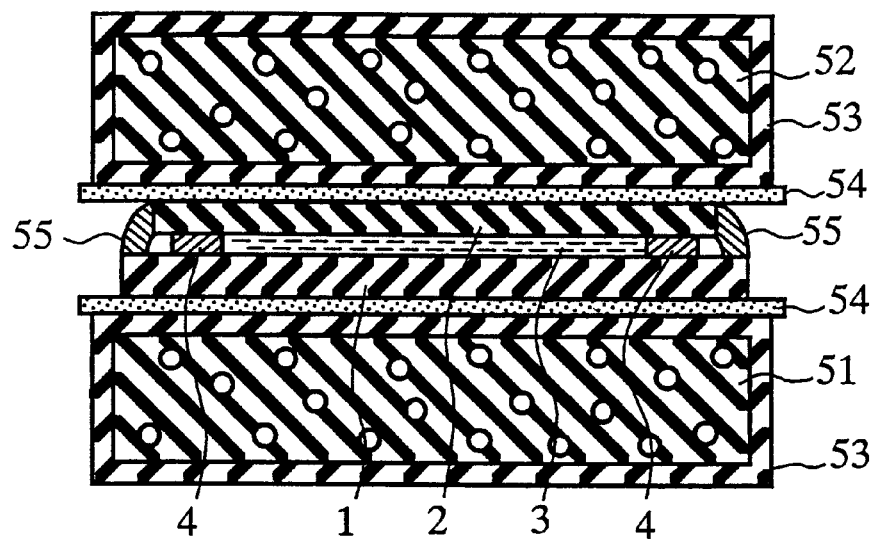
FIGS. 5A and 5B are schematic sectional views for description of Embodiment 5, continuous to FIGS. 4A to 4C, showing the steps of manufacturing the liquid crystal panel.
Figure 6A:
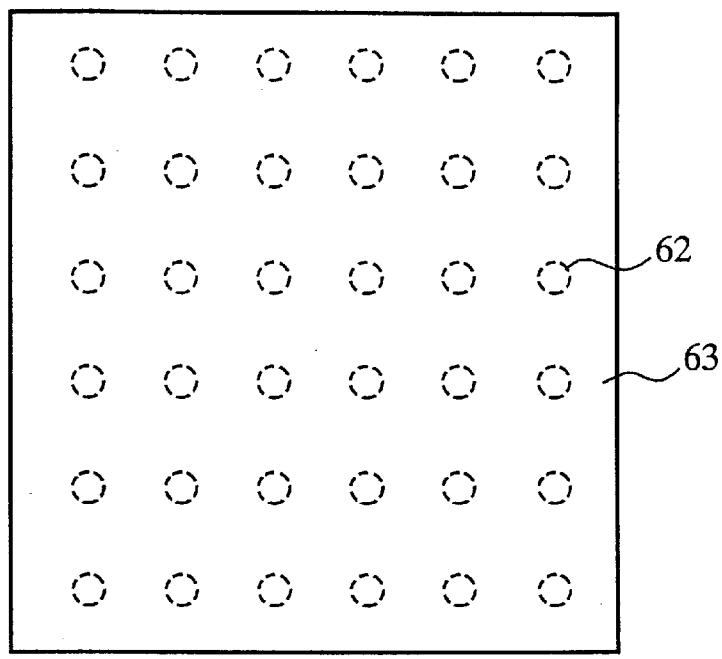
FIGS. 6A and 6B are schematic views showing a heat-resisting material covered with a silicon film.
Figure 6B:
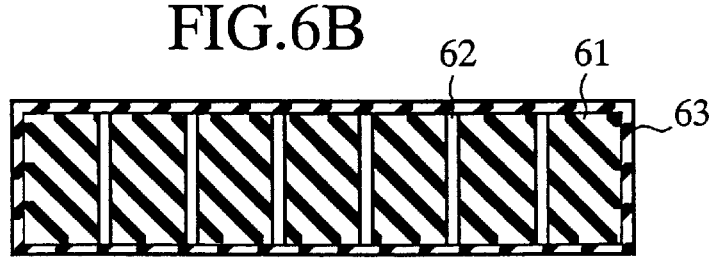

The liquid crystal sealing material 4 and pixel electrodes (not shown) disposed at a peripheral portion of the first substrate 1 are covered with the sealing material 55, for example, teflon based putty such as teflon rubber, a resin such as rosin, or copper (FIG. 5A).

Then, natural oxide formed on surfaces of the silicon films 53 covering the first and second porous substrates 51 and 52 is removed using hydrofluoric acid (HF).

Figure 5B:
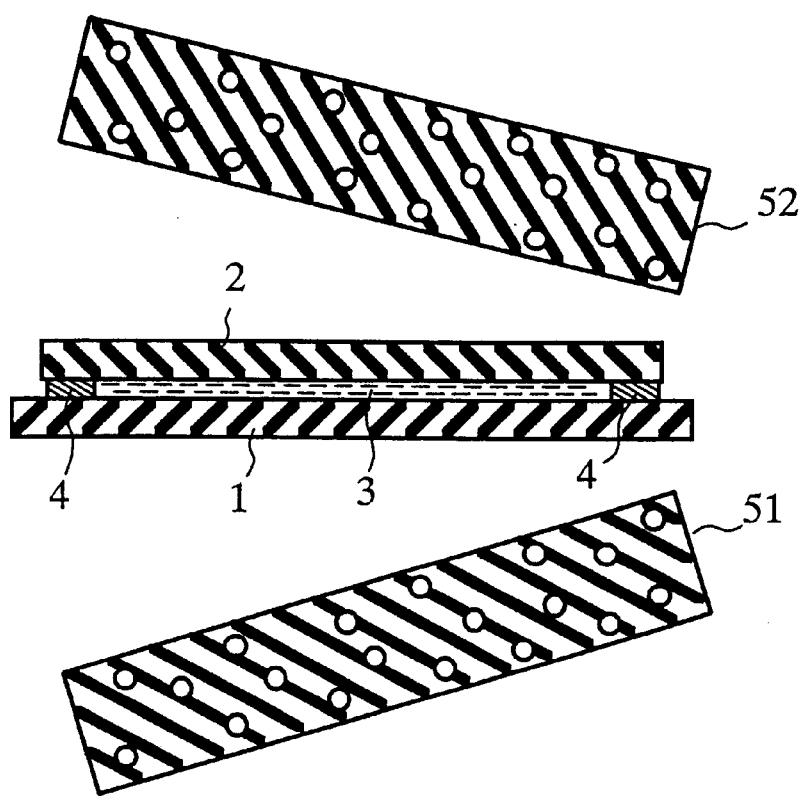

The silicon film 53 covering the entire surface of the first porous substrate 51 excluding the bonding surface thereof bonded to the first glass substrate 1 is dissolved by the peeling solution, and then the portion of the silicon film 53 positioned at the above bonding surface of the first porous substrate 51 by the peeling solution permeating in the pores of the first porous substrate 51, to thus peel the first glass substrate 1 from the first porous substrate 51. The second glass substrate 2 is similarly peeled from the second porous substrate 52 (FIG. 5B). The peeling step is carried out using the APW solution kept at about 70° C. as the peeling solution. After the peeling step, the adhesive layer 54 is removed as needed. FIG. 5B shows a state after the adhesive layer 54 is removed.

Then, a polarizing sheet is stuck on each of the first and second glass substrates 1 and 2, to thus accomplish a liquid crystal panel.

As described above, according to this embodiment, the first and second glass substrates 1 and 2, each having a thickness of an approximately 0.1 to 0.4 mm, are bonded on the first and second porous substrates 51 and 52 each being covered with the silicon film 53, respectively, and after the step of injecting liquid crystal, the first and second glass substrates 1 and 2 are peeled from the first and second porous substrates 51 and 51, respectively. As a result, there can be obtained an effect of capable of reducing a total weight of the glass substrates.

Further, in the case where a porous glass substrate is used as each of the first and second porous substrates 51 and 52 and the APW solution is used as the peeling solution, since the selection ratio of the APW solution is as large as $Si/SiO_2$=about 750, there can be obtained an effect of capable of re-using the porous substrates.

In addition, even in the case where an approximately 0.1–0.4 mm thick glass substrate bonded on a porous substrate having a surface covered with a silicon film is used as one of the first and second glass substrates 1 and 2, there can be obtained an effect of capable of reducing a total weight of the glass substrates.

Embodiment 6

In this embodiment, an approximately 10 $\mu$m thick SiO2 film, which is formed by CVD on a heat-resisting porous substrate having a surface covered with a silicon film, is used as each of first and second glass substrates, and the first and second glass substrates are peeled from the porous substrates after a step of injecting liquid crystal.

As the heat-resisting porous substrate, there is used a porous quartz glass substrate having pores of several $\mu$m in diameter (for example, MICRO POROIS GLASS MPG-AS, produced by Asahi Glass Co., Ltd.), or the heat-resisting material 61 such as SiC, Mo, or Invar shown in FIGS. 6A and 6B.

In manufacture of a liquid crystal panel, first, a silicon film having a thickness of several $\mu$m is formed on a surface of each of the first and second porous substrates by CVD. The pores in the surface of each of the first and second porous substrates are blocked by the silicon film.

An approximately 10 $\mu$m thick $SiO_2$ film is formed on a specific face of the first porous substrate by CVD, and the $SiO_2$ film thus formed is taken as a first glass substrate. Similarly, an approximately 10 $\mu$m thick $SiO_2$ film is formed on a specific face of the second porous substrate by CVD, and the $SiO_2$ film thus formed is taken as a second glass substrate.

Thereafter, the same procedure as that in Embodiment 5 is repeated, to accomplish a liquid crystal panel.

As described above, according to this embodiment, since the SiO2 film formed by CVD on the heat-resisting porous substrate having a surface covered with the silicon film is used as each of the first and second glass substrates, and the first and second glass substrates are peeled from the porous substrates after the step of injecting liquid crystal, there can be obtained an effect of capable of further thinning the first and second glass substrates, thereby further reducing a total weight of the first and second glass substrates.

Further, since the $SiO_2$ film formed by CVD is used as the first glass substrate, there can be obtained an effect of capable of reducing a resistance of a TFT array by allowing each TFT of the TFT array formed on the first glass substrate to be formed of a polysilicon TFT.

In addition, even in the case where an approximately 10 μm thick $SiO_2$ film formed by CVD on a heat-resisting porous substrate having a surface covered with a silicon film is used as one of the first and second glass substrates, there can be obtained an effect of capable of reducing a total weight of the glass substrates.

Embodiment 7

Figure 7:
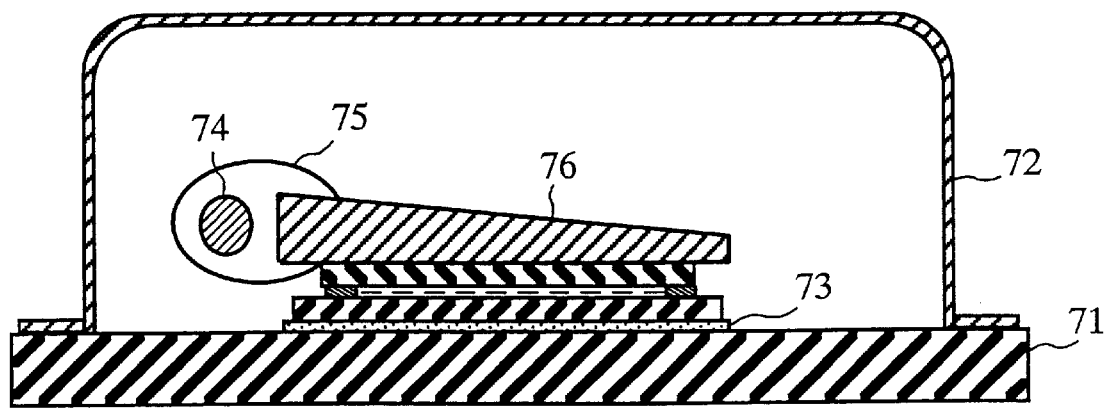
FIG. 7 is a schematic sectional view for description of Embodiment 7 of the present invention, showing a state in which a liquid crystal panel is bonded on a flat plate integrated with a housing in such a manner as to be covered with the housing.

FIG. 7 is a schematic sectional view for description of Embodiment 7, showing a state in which a liquid crystal panel of a backlight type is bonded on a transparent flat plate integrated with a housing in such a manner as to be covered with the housing. In this figure, reference numeral 71 indicates a transparent flat plate integrated with a housing; 72 is a housing; 73 is an adhesive layer for bonding the liquid crystal panel on the flat plate 71; 74 is a cold-cathode tube; 75 is a reflector; and 76 is a light guide plate. Other reference numerals are the same as those in FIGS. 1A and 1B. As the liquid crystal panel to be bonded on the flat plate 71, there is used the liquid crystal panel manufactured in each of Embodiments 1 to 6. In this case, an outer face of a first glass substrate reversed to its inner face opposed to an inner face of a second glass substrate 2, is bonded on the flat plate 71. The flat plate 71 is made from a material being lightweight, transparent, and high in impact resistance, such as acrylic resin.

As described above, according to this embodiment, since the liquid crystal panel manufactured in each of Embodiments 1 to 6 is bonded on the transparent flat plate 71 integrated with the housing 72 in such a manner as to be covered with the housing 72, there can be obtained an effect of capable of improving an impact resistance of the panel, thereby eliminating a fear of fracture of the panel even if the panel is dropped down.

Although in each of the embodiments, description is made of the color TFT liquid crystal panel in which a TFT array is formed on the first glass substrate and a color filter is formed on the second substrate, the present invention is not limited thereto, and can be also applied to a liquid crystal in which two glass substrates are laminated to each other and liquid crystal is injected therebetween, for example, a simple matrix type liquid crystal panel.

What is claimed is:

1. A method of manufacturing a liquid crystal display panel comprising:

laminating a first glass substrate containing sodium, on which a thin film transistor (TFT) array is disposed, onto a second glass substrate on which a color filter is disposed;

injecting a liquid crystal material between the laminated first and second glass substrates;

after injecting the liquid crystal material, etching at least one of the first and second glass substrates from an outer face, opposite an inner face, inner faces of the first and second glass substrates directly facing each other; and forming on a face of the first glass substrate, before a heat-treatment step, a barrier film for preventing diffusion of sodium.

2. The method of manufacturing a liquid crystal panel according to claim 1, wherein etching comprises a step of:

spraying etchant on the glass substrate outer face to be etched from holes in a shower head disposed opposite the glass substrate outer face.

3. The method of manufacturing a liquid crystal panel according to claim 1, wherein the first and second glass substrates are free of barium.

4. The method of manufacturing a liquid crystal panel according to claim 1, further comprising, after etching, bonding the outer face of the first glass substrate to a flat plate integrated with a housing, the housing covering the first and second glass substrates.

5. A method of manufacturing a liquid crystal panel, the method comprising:

laminating a first glass substrate on which a thin film transistor (TFT) array is disposed onto a second glass substrate on an inner face of which spaced apart rows of color filters are disposed, each color filter being provided for a respective display dot;

injecting liquid crystal material between the laminated first and second glass substrates; and etching the second glass substrate from an outer face opposite an inner face, inner faces of the first and second glass substrates directly facing each other, after injecting the liquid crystal material, to form convex microlenses which are part of and include parts of the outer face of the second glass substrate, the outer face of the second glass substrate having a corrugated surface including respective recesses located at boundaries between adjacent rows of display dots.

6. The method of manufacturing a liquid crystal panel according to claim 5, wherein etching the second glass substrate comprises:

forming a resist pattern on the outer face of the second glass substrate, the resist pattern having openings opposite boundaries between the spaced apart rows of color filters;

etching the outer face of the second glass substrate using the resist pattern as an etching mask;

removing the resist pattern; and etching the outer face of the second glass substrate again.

7. A method of manufacturing a liquid crystal panel, the method comprising:

bonding a porous substrate having a surface covered with a silicon film to at least one of a first glass substrate and a second glass substrate;

laminating the first glass substrate on which a thin film transistor (TFT) array is disposed onto the second glass substrate on which a color filter is disposed;

injecting liquid crystal material between the laminated first and second glass substrates; and after injecting the liquid crystal material, dissolving a portion of the silicon film at a surface of the porous substrate bonded to one of the first and second glass substrates using a peeling solution permeating the porous substrate, and removing the one of the first and second glass substrates bonded to the porous substrate from the porous substrate.

8. The method of manufacturing a liquid crystal panel according to claim 7, further comprising, after removing the one of the first and second glass substrates from the porous substrate, bonding an outer face of the first glass substrate to a flat plate integrated with a housing, the housing covering the first and second glass substrates.

9. A method of manufacturing a liquid crystal panel, the method comprising:

laminating a first glass substrate on which a thin film transistor (TFT) array is disposed to a second glass substrate on which a color filter is disposed, one of the first and second glass substrates including an $SiO_2$ film formed by chemical vapor deposition (CVD), and a heat resisting porous substrate having a surface covered with a silicon film;

injecting liquid crystal material between the laminated first and second glass substrates; and after injecting the liquid crystal material, dissolving a portion of the silicon film at the surface and using a peeling solution permeating the porous substrate to remove the one of first and second glass substrates including the porous substrate from the porous substrate.

10. The method of manufacturing a liquid crystal panel according to claim 9, further comprising, after removing the one of the first and second glass substrates from the porous substrate, bonding the outer face of the first glass substrate to a flat plate integrated with a housing, the housing covering the first and second glass substrates.

* * * * *

UNITED STATES PATENT AND TRADEMARK OFFICE
CERTIFICATE OF CORRECTION

PATENT NO. : 6,108,063
DATED : August 22, 2000
INVENTOR(S) : Yuuki et al.

It is certified that error appears in the above-identified patent and that said Letters Patent is hereby corrected as shown below:

<u>Title page, item [73],</u>
Should read, Assignee: Mitsubishi Denki Kabushiki Kaisha. Tokyo, Japan Signed and Sealed this Thirteenth Day of November, 2001

Attest:

*Nicholas P. Godici*

NICHOLAS P. GODICI
*Attesting Officer*   *Acting Director of the United States Patent and Trademark Office*